United States Patent [19]

El-Sheikh

[11] 4,440,267
[45] Apr. 3, 1984

[54] DISC BRAKE

[75] Inventor: Kamal El-Sheikh, Trenton, Mich.

[73] Assignee: Kelsey Hayes Company, Romulus, Mich.

[21] Appl. No.: 314,637

[22] Filed: Oct. 26, 1981

[51] Int. Cl.³ .............................................. F16D 65/38
[52] U.S. Cl. ................................ 188/73.35; 188/73.43
[58] Field of Search ................ 188/73.35, 73.43, 73.45

[56] References Cited

U.S. PATENT DOCUMENTS

| 3,625,314 | 12/1971 | Rinker | 188/73.35 X |
| 3,648,807 | 3/1972 | Lottridge et al. | 188/73.43 |
| 4,084,665 | 4/1978 | Burnett | 188/73.45 |
| 4,244,451 | 1/1981 | Johannesen | 188/73.45 |
| 4,310,075 | 1/1982 | Johannesen et al. | 188/73.35 X |

FOREIGN PATENT DOCUMENTS

| 2252240 | 5/1974 | Fed. Rep. of Germany | 188/73.43 |
| 2284800 | 4/1976 | France | 188/73.43 |

Primary Examiner—George E. A. Halvosa
Attorney, Agent, or Firm—Ralph J. Skinkiss

[57] ABSTRACT

A floating caliper disc brake of the rail-slider type is disclosed. A low friction member is positioned between the anchor plate rails, upon which the caliper is supported, and the opposing caliper rails. The low friction member permits free movement of the caliper with respect to the anchor plate and further functions as an anti-rattle device.

2 Claims, 8 Drawing Figures

DISC BRAKE

BACKGROUND OF THE INVENTION

The present invention relates to a floating caliper disc brake of the rail-slider type wherein the caliper is slidably supported upon two anchor plate rails extending axially over the disc or rotor.

SUMMARY OF THE INVENTION

According to the present invention a rail-slider type caliper disc brake assembly is taught having a low friction member positioned between the anchor plate rails and the complimentary sliding caliper rails. The low friction member is preferably made of a resilient material such as Teflon which is capable of transferring the braking torque from the caliper to the anchor plate rails and also have a relatively low coefficient of friction permitting free caliper movement relative to the anchor plate rails.

DETAILED DESCRIPTION OF THE PREFERRED EMBODIMENT

Figure 1:
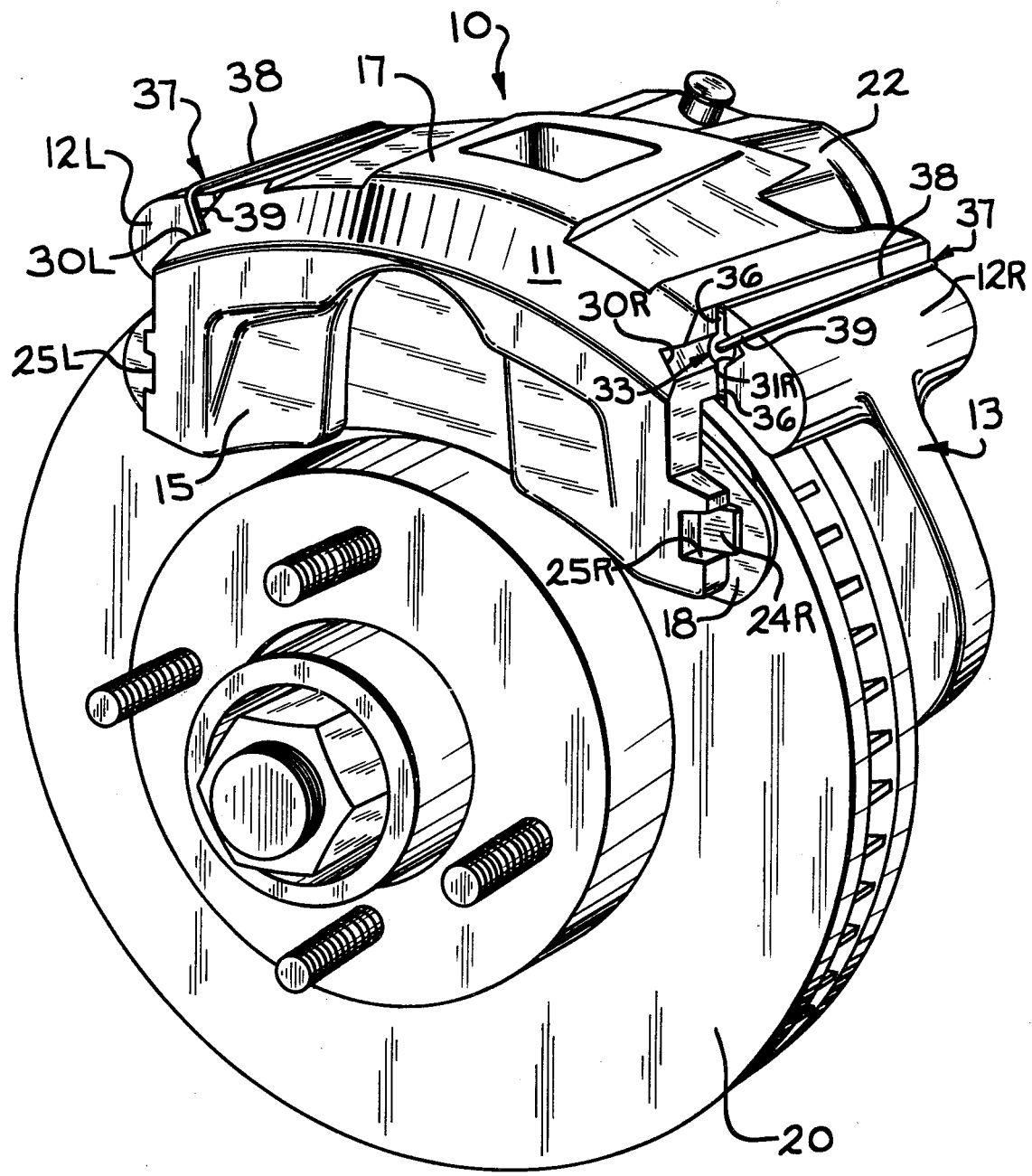
FIG. 1 is a perspective view of a preferred disc brake embodying the present invention.

Referring to FIGS. 1-6 of the drawings, disc brake 10 is a typical example of the preferred embodiment of the invention. For purposes of illustration, disc brake 10 is shown in the drawings and described below as a hydraulically-actuated brake for mounting on the left side of a vehicle. One skilled in the art will recognize from the following discussion, however, that the invention is equally applicable to disc brakes employing any of several known types of actuating media and apparatus and to such brakes for mounting on either side of a vehicle.

Disc brake 10 includes caliper 11 slidably received between torque receiving arms 12L and 12R of anchor 13 which is fixed to a stationary portion of the vehicle. Caliper 11 has outboard leg 15 and inboard leg 16 interconnected by bridge portion 17. Outboard leg 15 and inboard leg 16 includes outboard friction element 18 and inboard friction element 19, respectively, which are positioned on opposite sides of disc or rotor 20.

Figure 2:
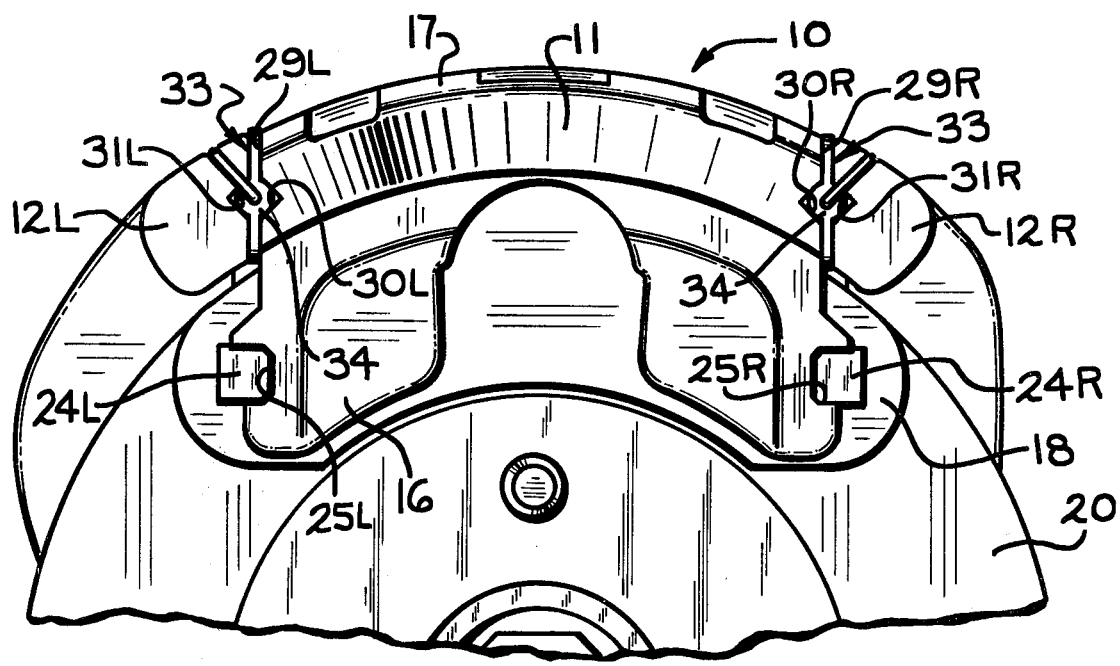
FIG. 2 is a partial front elevation view of the disc brake of FIG. 1.
Figure 3:
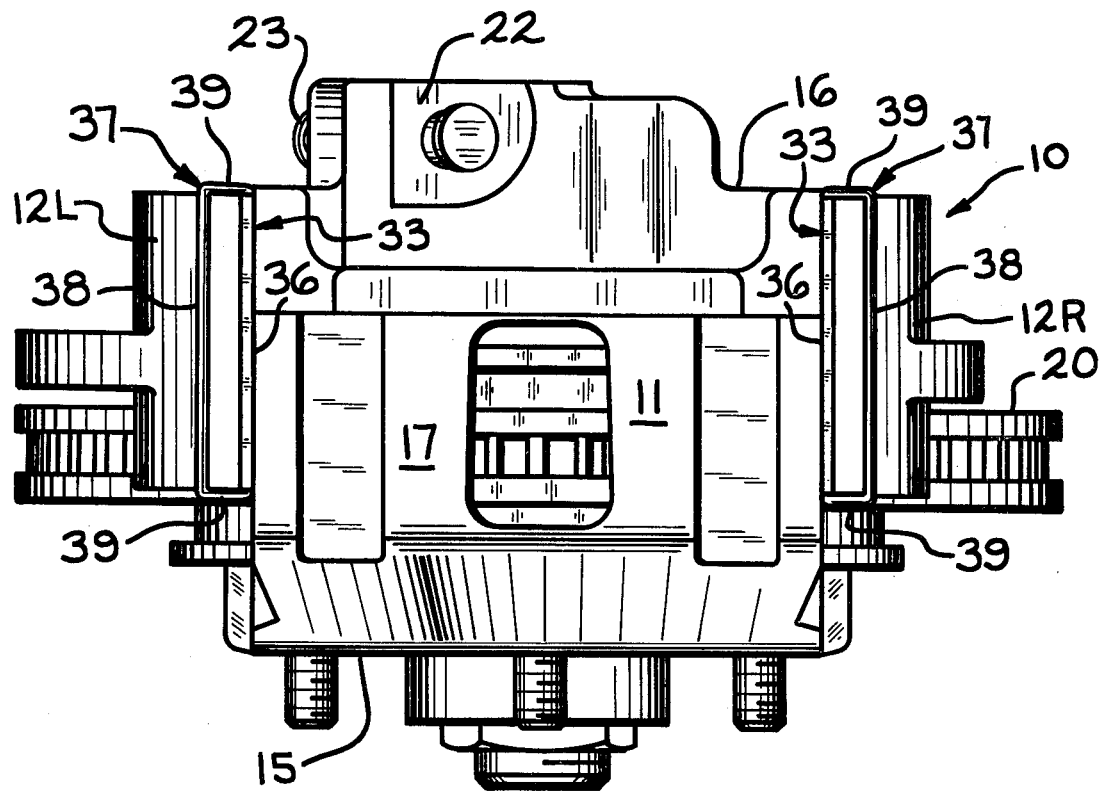
FIG. 3 is a top view of the disc brake of FIG. 1.

Inboard leg 16 of caliper 11 houses brake actuator 22, including a piston slidably contained within a hydraulic cylinder into which hydraulic fluid is introduced through inlet port 23. As is shown in FIG. 2, outboard leg 15 includes caliper slots 25L and 25R for interlockingly receiving tabs 24L and 24R, respectively, of outboard friction element 18. Similarly, as is shown in FIG. 4, anchor 13 includes anchor slots 26L and 26R for interlockingly receiving tabs 27L and 27R, respectively, of inboard friction element 19.

Figure 4:
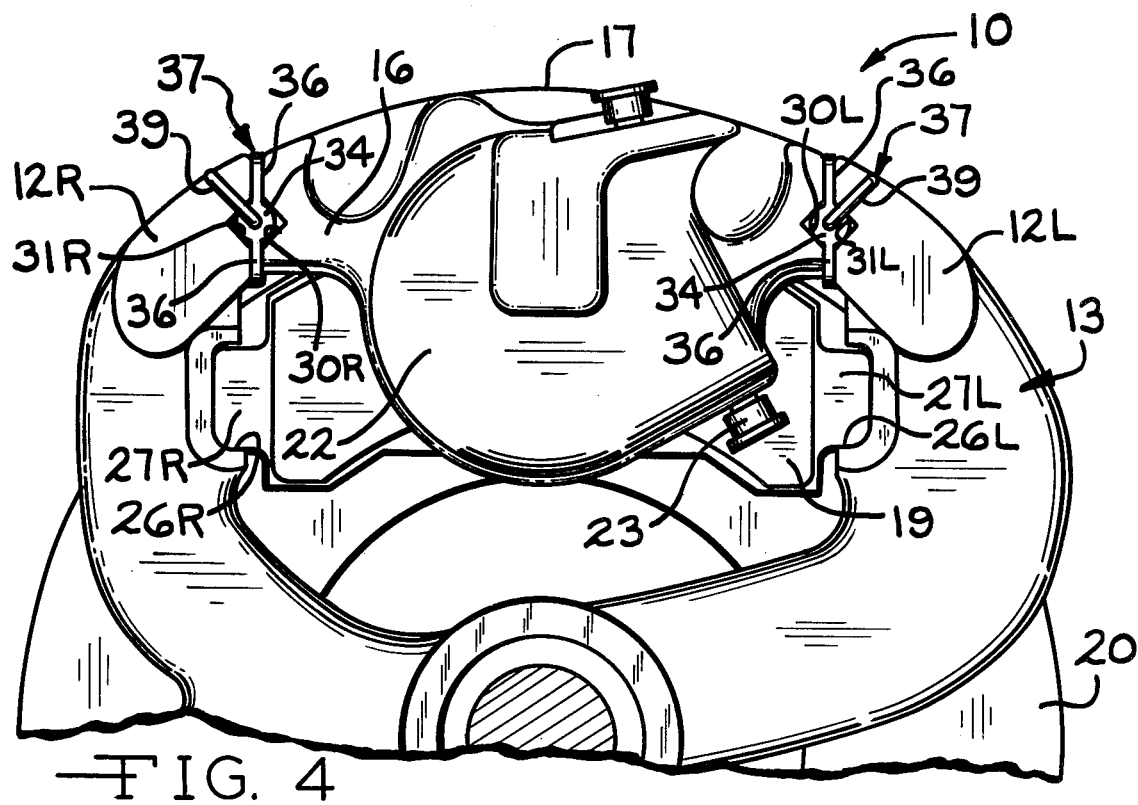
FIG. 4 is a partial rear elevation view of the disc brake of FIG. 1.
Figure 5:
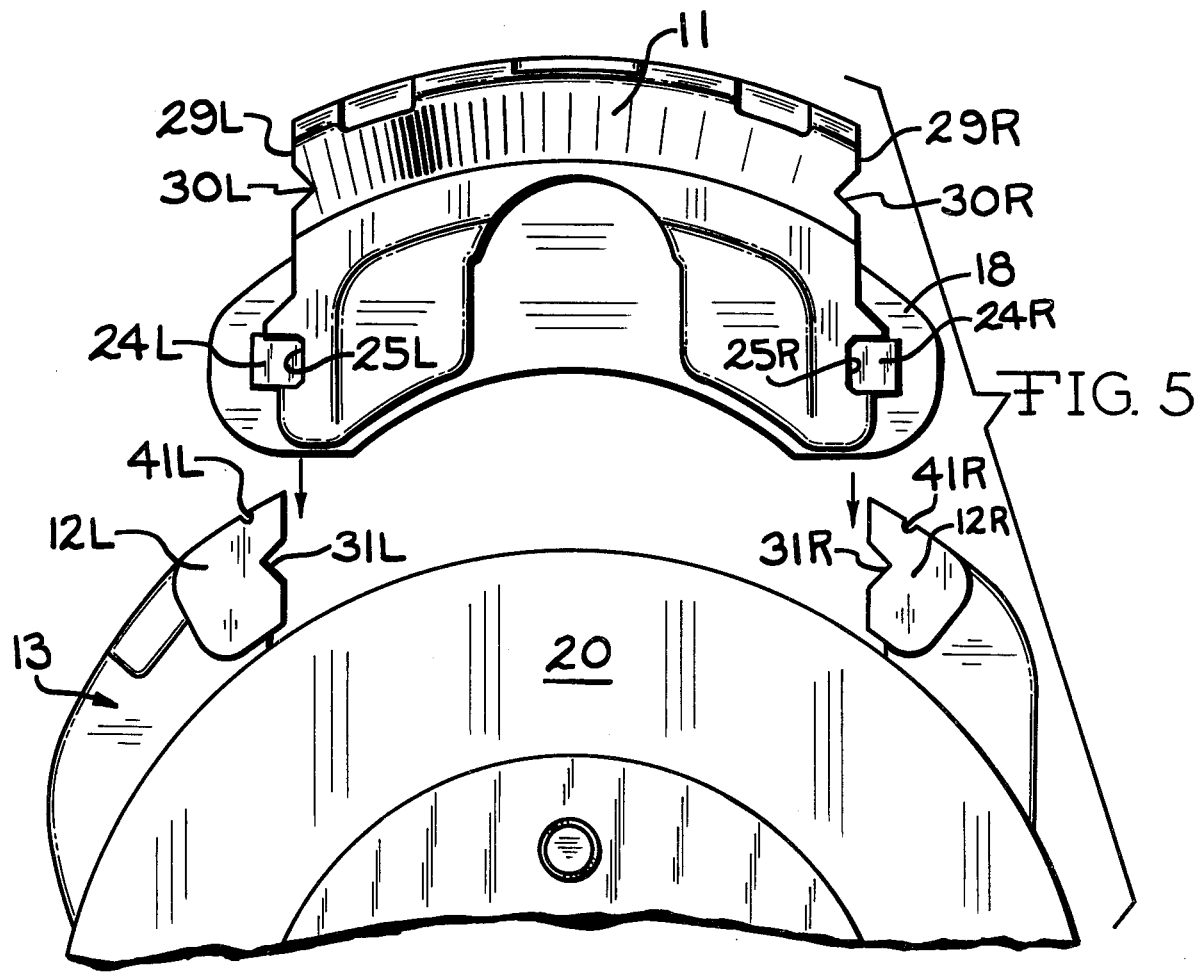
FIG. 5 is a partial front elevation view of the disc brake of FIG. 1, with the caliper removed from the anchor member.
Figure 6:
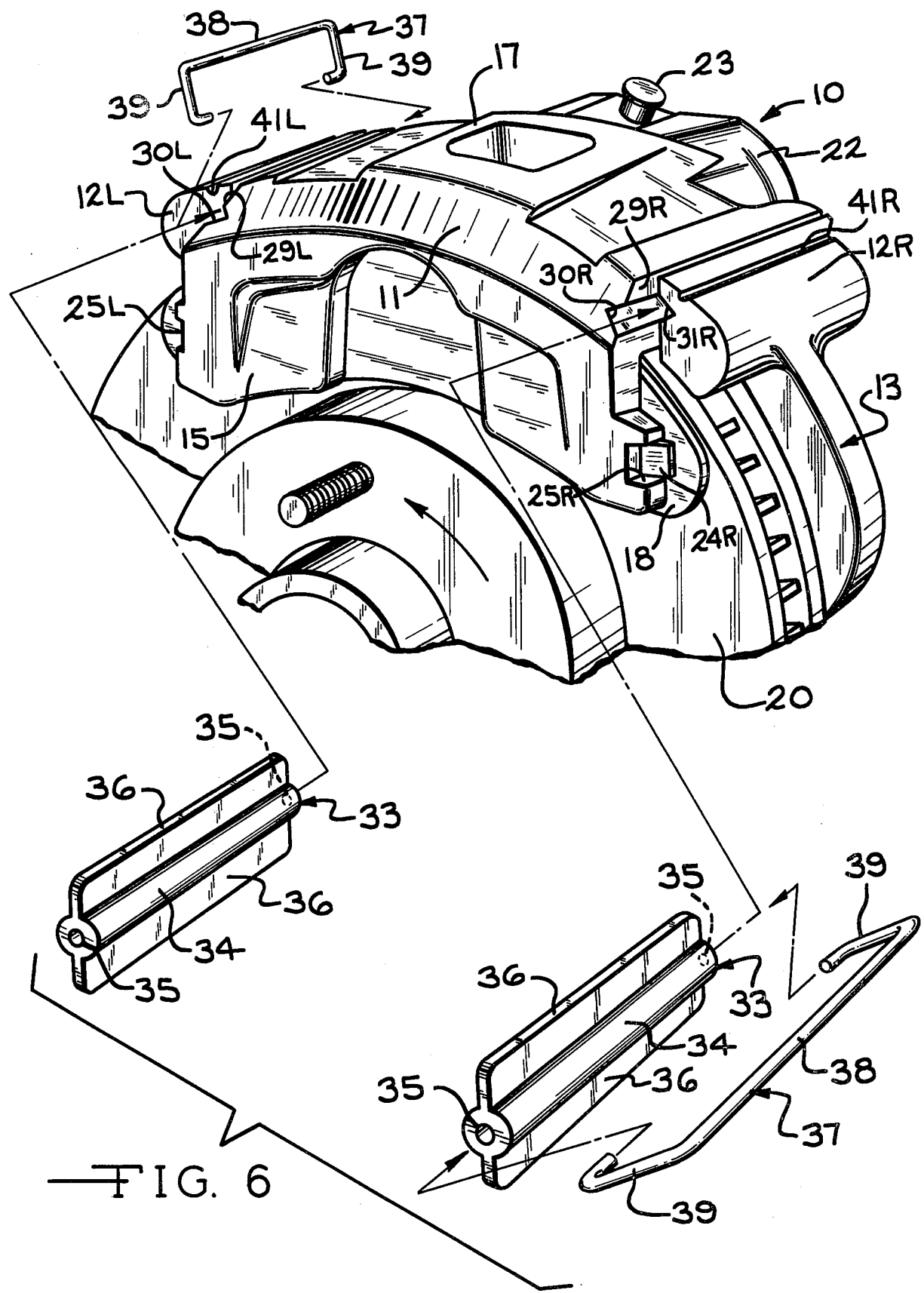
FIG. 6 is a partially exploded perspective view of the disc brake of FIG. 1, with various components enlarged.

Referring to FIGS. 4 through 6, the caliper bridge 17 has V-shaped caliper grooves 30L and 30R extending axially along abutment surfaces 29L and 29R, respectively, to separate each said surface into substantially planar portions. Anchor arms 12L and 12R include V-shaped anchor grooves 31L and 31R extending axially along the anchor to separate surfaces of said arms into planar portions. Caliper groove 30L opposes anchor groove 31L, and caliper groove 30R opposes anchor groove 31L, to form a pair of axially-extending slots each receiving one of a pair of bearing inserts 33.

FIG. 6 also shows an enlarged view of preferred bearing inserts 33, each having a post or pin portion 34 with apertures 35 at opposite axial ends thereof. Each bearing insert 33 also includes a pair of substantially planar blade portions 36 protruding in opposite radial directions from pin portion 34. Bearing inserts 33 are preferably composed of a low-friction, resilient material capable of withstanding compressive stresses of up to 3000 pounds per square inch and temperatures of up to 200° F. in service. Although Teflon is the preferred material for bearing inserts 33, any of a number of known low-friction, resilient compositions capable of withstanding such stresses and temperatures may be employed. An example of such alternate material is phenolic coated with Teflon.

Bearing inserts 33 are preferably held in place by resilient retaining clips 37. Retaining clips 37 each preferably have a central portion 38 interconnecting a pair of hooked legs 39. Central portions 38 are each received in axially-extending recesses 41L and 41R on anchor arms 12L and 12R, respectively. Hooked legs 39 on each of retaining clips 37 extend radially from central portions 38 to engage apertures 35 on each end of bearing inserts 33, thereby preventing bearing inserts 33 from sliding in either an inboard or outboard axial direction relative to anchor arms 12L and 12R.

Figure 7:
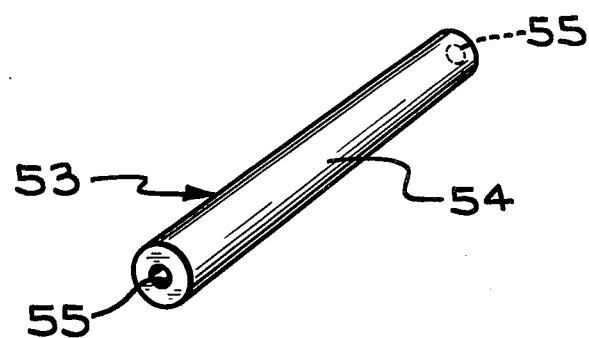
FIG. 7 is an enlarged view of an alternate bearing insert of the present invention.

FIG. 7 illustrates an alternate bearing insert 53 having a post or pin 54, but without blade portions 36 of preferred bearing inserts 33. Alternate bearing insert 53 also includes apertures 55 at opposite axial ends thereof. Bearing insert 53 is received between caliper grooves 30L and 30R and anchor grooves 31L and 31R, respectively, and a gap is thus created between caliper abutment surfaces 29L and 29R and anchor arms 12L and 12R, respectively.

Bearing inserts 53 are preferably composed of Teflon or other suitable materials having the characteristics discussed above for preferred bearing inserts 33. Bearing inserts 53 are fixed to anchor arms 12L and 12R by resilient retaining clips 37 which engage recesses 41L and 41R on anchor arms 12L, 12R, respectively.

Although alternate bearing insert 53 is shown as having a cylindrical cross-section, one skilled in the art will readily recognize that other cross-sectional shapes, such as rectangles, triangles or even irregular shapes, may be employed either with or without blade portions 36. The use of such alternate shapes requires, of course, appropriately shaped caliper grooves and anchor grooves for receiving such alternate bearing inserts.

Figure 8:
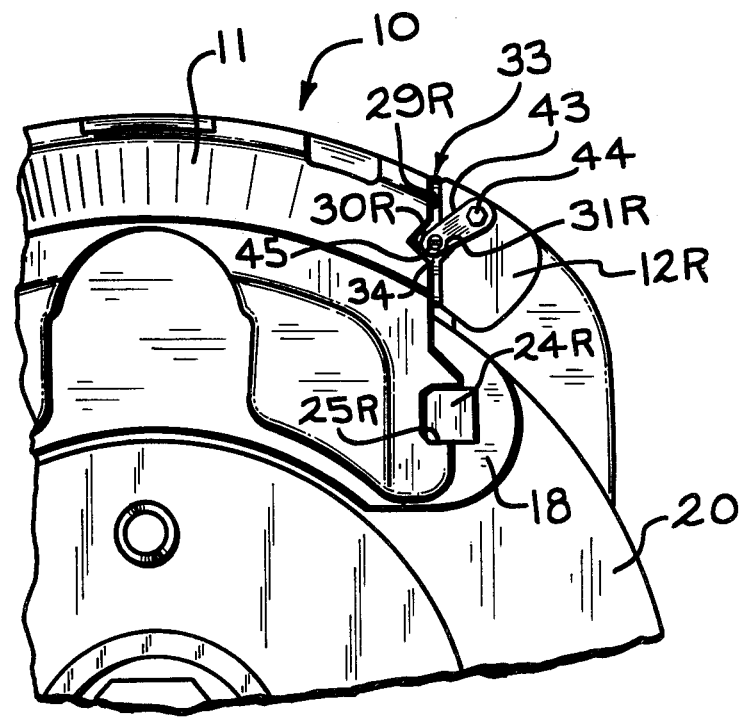
FIG. 8 is partial front elevation view of an alternate embodiment of the present invention.

Although retaining clips 37 are preferred, any of a number of known retaining apparatus may be used to prevent preferred bearing inserts 33 or any alternate bearing inserts from sliding in an axial direction relative to anchor arms 12L and 12R. An example of such alternate retaining structure is illustrated in FIG. 8, wherein retaining plate 43 extends in a radial direction from anchor arm 12R to engage an end of pin portion 34 of bearing insert 33. One end of retaining plate 43 is fixed to anchor arm 12R by retainer bolt 44 and the opposite end is secured to bearing insert 33 by fastener 45 protruding through retaining plate 43 to threadably engage aperture 35 in pin portion 34. Although retaining plates 43 are shown in connection with preferred bearing inserts 33, they are equally applicable to disc brakes employing alternately-shaped bearing inserts such as those illustrated in FIG. 7.

The operation of disc brake 10, the preferred embodiment of the invention, is as follows. Hydraulic fluid is forced into the hydraulic cylinder of brake actuator 22, through inlet port 23, the piston (not shown) slidably urges inboard friction element 19 into frictional engagement with the inboard face of rotor 20. A reaction force on inboard leg 16 causes caliper 11 to slide in an inboard axial direction, thereby urging outboard friction element 18 into frictional engagement with the outboard face of rotor 20.

As disc brake 10 is actuated, blade portions 36 of bearing insert 33 provide a non-corroding, low-friction bearing surface upon which caliper 11 slides. Furthermore, because of their relatively low modulus of elasticity, typically 95,000 psi. for Teflon, bearing inserts 33 have a dampening effect on the circumferentially-directed forces resulting from braking torque being transmitted through caliper 11 to anchor 13. Damper inserts 33 simulate hydraulic dampers between abutment surfaces 29L and 29R of caliper 11 and anchor arms 12L and 12R, respectively, thereby "smoothing out" the peak values of such forces during heavy braking. Such dampening effect increases the life of brake components such as the caliper and anchor as well as causing a smoother brake feel on the part of the vehicle operator.

Bearing inserts 33 also tend to maintain caliper 11 in an axially aligned location relative to anchor arms 12L and 12R. If caliper 11 shifts out of axial alignment, pin portions 34 are compressed into caliper grooves 30L and 30R and V-shaped anchor grooves 31L and 31R. Such compression causes bearing inserts 33 to exert a reactive force on the sides of said V-shaped grooves, thereby tending to urge caliper 11 into axial alignment with anchor arms 12L and 12R.

Finally, bearing inserts 33 serve an anti-rattle function. By providing a resilient barrier between abutment surfaces 29L and 29R and anchor arms 12L and 12R, respectively, bearing inserts 33 prevent metal-to-metal contact between caliper 11 and anchor 13.

Alternate bearing inserts 52 perform the same functions, and provide the same advantages, as do preferred bearing inserts 33. With bearing inserts 53, however, gaps 58L and 58R are maintained between the opposite circumferential ends of caliper 11 and anchor arms 12L and 12R, thereby eliminating the need to machine abutment surfaces 29L and 29R on caliper 11.

In disc brake 10, as shown in the drawings, the brake torque is transmitted through caliper 11 to anchor 13 only from outboard friction element 18 since inboard friction element 19 transmits its braking torque directly to anchor 13 due to the interlocking engagement of tabs 27L and 27R, respectively. However, one skilled in the art will readily recognize from the foregoing discussion that the invention may be advantageously applied to brakes having both friction elements transmitting braking torque through the caliper as well as to brakes in which both friction elements transmit braking torque directly to the anchor member.

The foregoing description illustrates merely exemplary embodiments of the present invention. Various changes may be made in the arrangements and details of production of the embodiments shown and described without departing from the spirit and scope of the present invention.

I claim:

1. In a disc brake having a disc rotatable about an axis, inboard and outboard friction assemblies engageable with inboard and outboard friction surfaces on said disc, caliper means for forcing said inboard and outboard friction assemblies into frictional engagement with the inboard and outboard friction surfaces respectively, thereby activating said brake, at least two fixed torque receiving arms extending axially over the periphery of said disc straddling said caliper therebetween, said caliper and each of said arms having generally parallel planar opposed abutment surface portions, axially extending grooves intermediate respective planar surface portions, the improvement comprising a generally elongated load bearing pin having a pair of oppositely protruding planar blade portions, said pin being positioned within opposed grooves to slidably support said caliper between said torque receiving arms with said planar blade portions being positioned between and in load receiving relationship with said caliper and arm planar portions.

2. The disc brake as claimed in claim 1 wherein said load bearing member is resilient.

* * * * *